March 21, 1950 H. T. KRAFT ET AL 2,501,644
METHOD OF BUILDING STEEL CABLE TIRE PLY BANDS
Filed Jan. 26, 1946 9 Sheets-Sheet 4

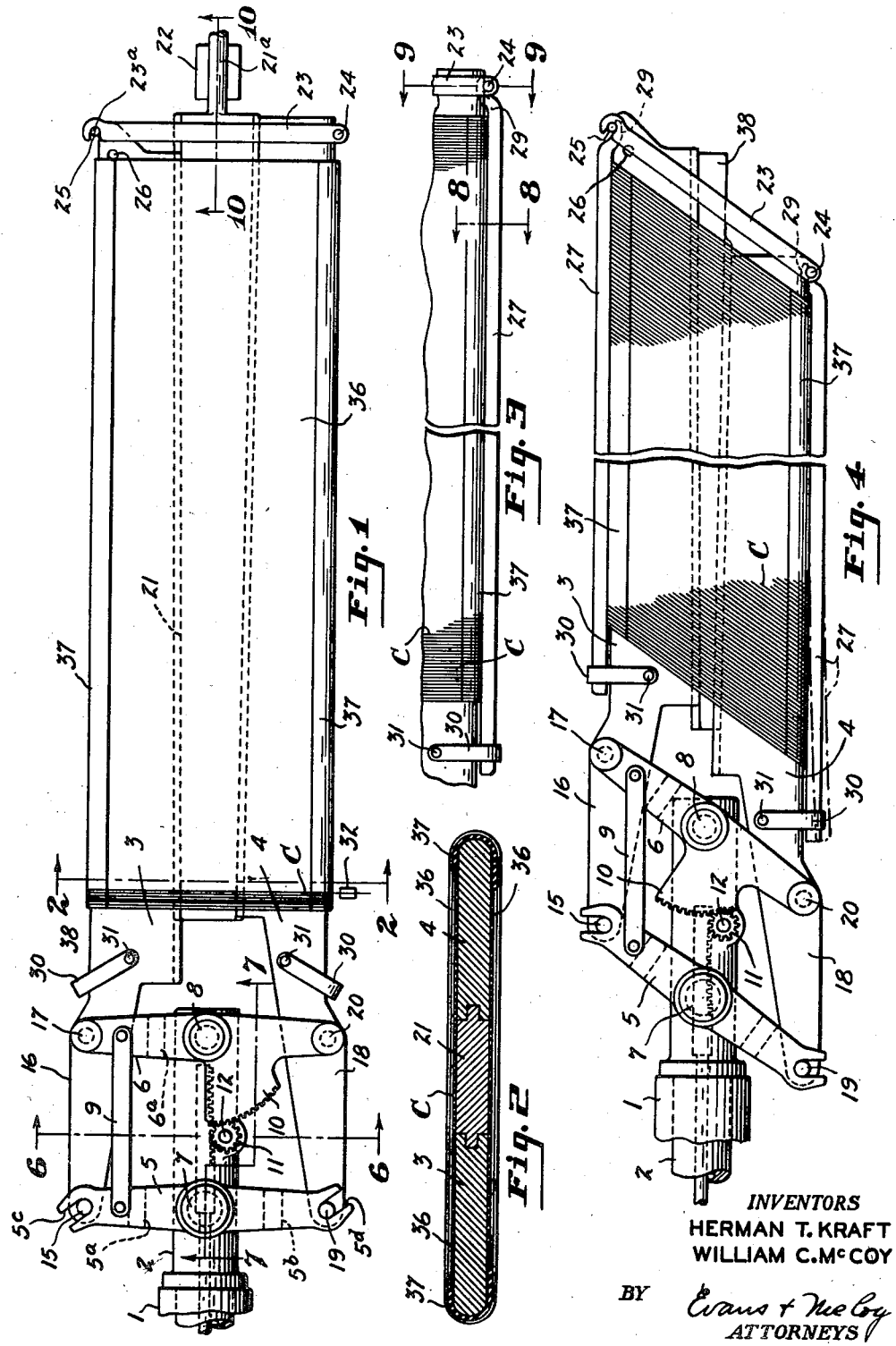

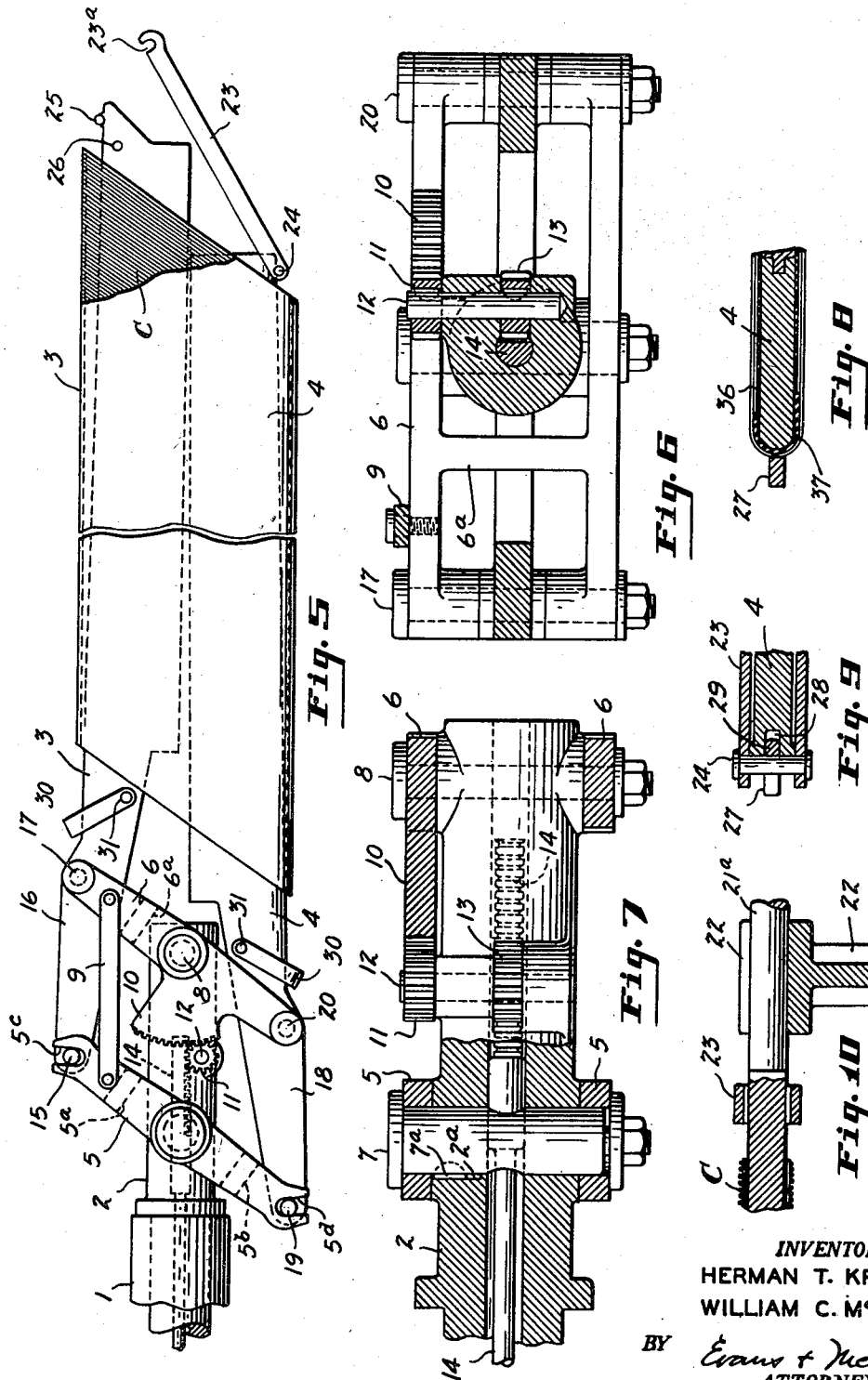

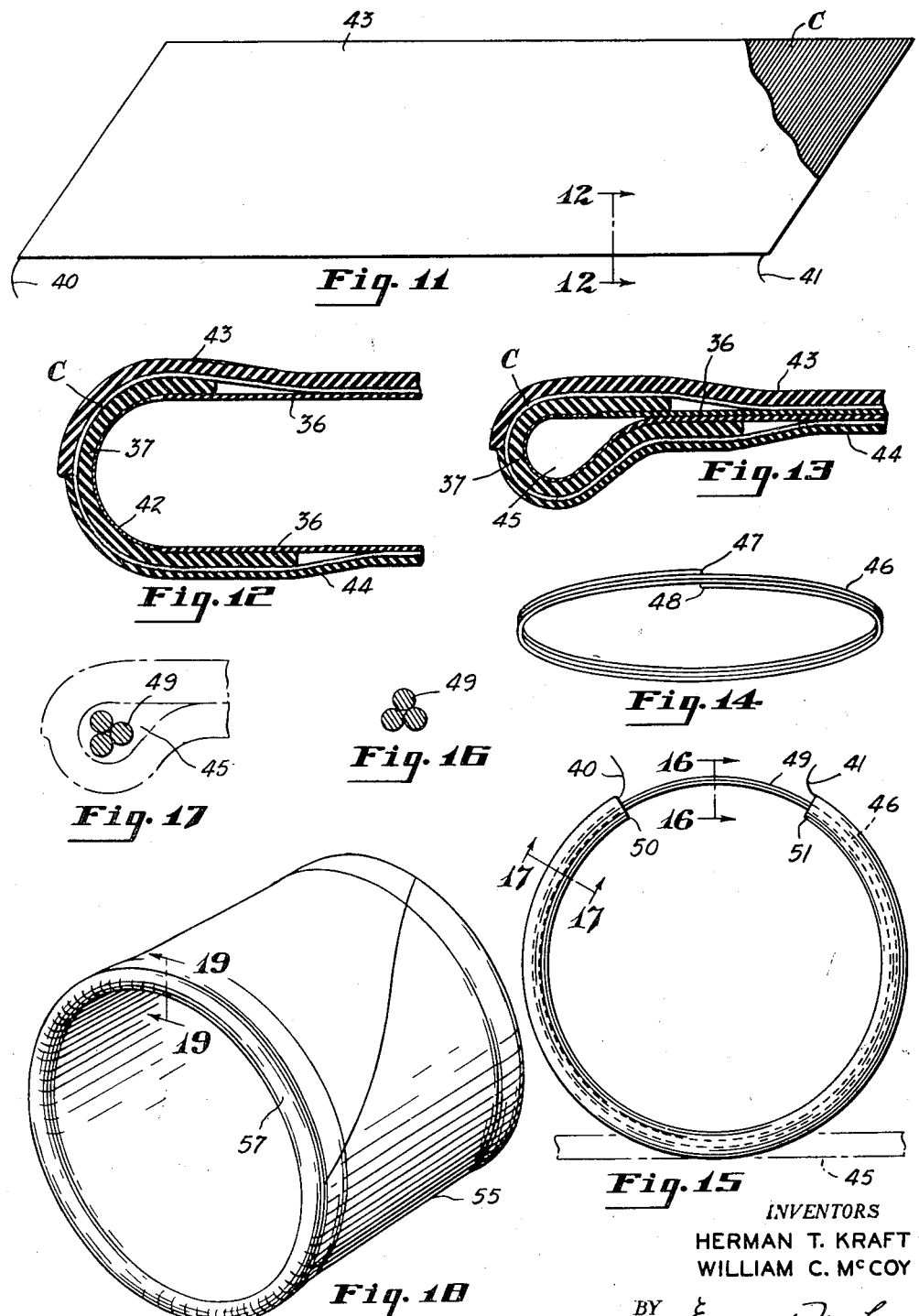

INVENTORS
HERMAN T. KRAFT
WILLIAM C. McCOY
BY Evans & McCoy
ATTORNEYS

March 21, 1950     H. T. KRAFT ET AL     2,501,644
METHOD OF BUILDING STEEL CABLE TIRE PLY BANDS
Filed Jan. 26, 1946     9 Sheets-Sheet 5

INVENTORS
HERMAN T. KRAFT
WILLIAM C. McCOY
BY Evans & McCoy
ATTORNEYS

March 21, 1950 H. T. KRAFT ET AL 2,501,644
METHOD OF BUILDING STEEL CABLE TIRE PLY BANDS
Filed Jan. 26, 1946 9 Sheets-Sheet 6
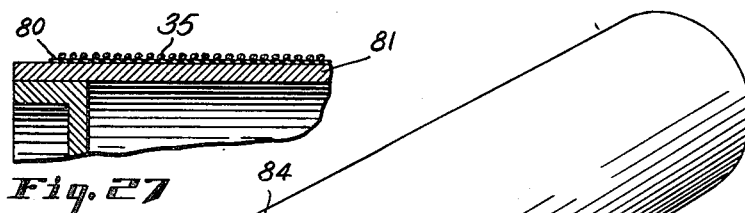
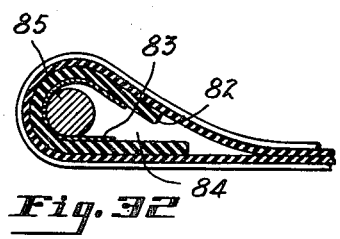
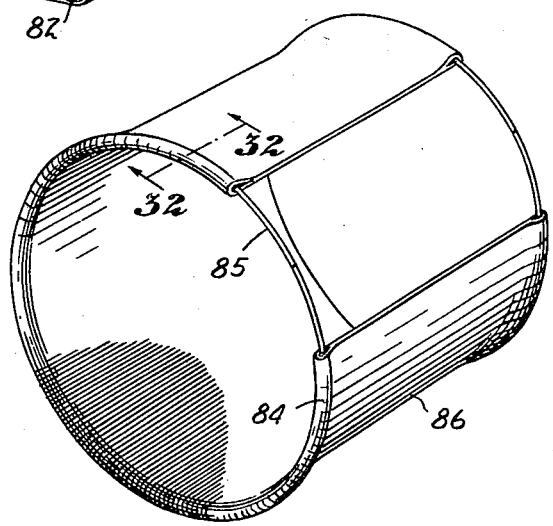
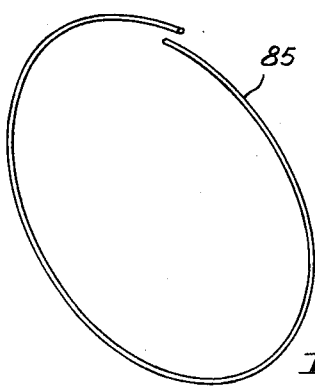
INVENTORS
HERMAN T. KRAFT
WILLIAM C. McCOY
BY Evans + McCoy
ATTORNEYS March 21, 1950  H. T. KRAFT ET AL  2,501,644
METHOD OF BUILDING STEEL CABLE TIRE PLY BANDS
Filed Jan. 26, 1946  9 Sheets-Sheet 7

INVENTORS
HERMAN T. KRAFT
WILLIAM C. McCOY

BY Evans & McCoy
ATTORNEYS

Patented Mar. 21, 1950

2,501,644

UNITED STATES PATENT OFFICE 2,501,644

METHOD OF BUILDING STEEL CABLE TIRE PLY BANDS

Herman T. Kraft, Akron, and William C. McCoy, Shaker Heights, Ohio, assignors to The General Tire & Rubber Company, Akron, Ohio, a corporation of Ohio Application January 26, 1946, Serial No. 643,580

6 Claims. (Cl. 154—14)

This invention relates to a machine for and a method of making pneumatic tire casings and other devices employing similarly reinforced body constructions. Pneumatic tires of the kind formed from plies produced by said machine and method are particularly suitable for use on aircraft landing wheels, motor vehicles, earth moving equipment, and the like. The invention is particularly illustrated and described as suitable for the manufacture of pneumatic tire casings in which each of the ply blands employed in making the tire comprises at least one continuous endless cord or reinforcing member, preferably of cabled high tensile steel wire or similar high tensile material, and spaced bead members which interlock with loops formed by the convolutions of the continuous reinforcing member, the runs of which extend side by side across the space between the beads, said reinforcing member and the bead members being embedded in a suitable vulcanized rubber compound.

In each ply the cords or reinforcing members may extend at any desired angle relative to the cords of the adjacent ply as in conventional pneumatic tire constructions.

One of the objects of the invention is to provide a machine and method of building ply members having an endless reinforcing member embedded therein and suitable for use in the manufacture of pneumatic tires and the like.

Another object of the invention is to provide a method and machine for so winding a reinforcing member such as wire or cable or the like that uniform spacing of adjacent turns of the reinforcing member is obtained and in which the angularity of the reinforcing member relative to the longitudinal axis of the ply is accurately controlled.

Another object of the invention is to provide a machine by means of which a flat helix may be wound and the turns of the helix anchored at diametrically opposite sides thereof, and by means of which one side of the helix may be shifted relative to the other to dispose the convolutions at a definite angularity relative to the longitudinal axis of the winding while maintaining them in uniformly spaced parallel relation.

Heretofore tires employing reinforcing members of high tensile cabled steel wire have required the manufacture of sheet material in which the reinforcing members are embedded in parallel relation in a sheet of rubber compound and the sheet is then cut on an angle to provide ply material that is assembled in tire form in accordance with usual manufacturing practices. The severed ends of the cabled steel wire are so sharp and difficult to handle that workmen's hands are badly cut and the building of a tire in such form is so laborious and difficult that such material heretofore has not been used except experimentally in the manufacture of tire casings.

The method and apparatus illustrated and described herein simplifies the handling of steel wire or cable reinforcing material in the manufacture of tires and like reinforced rubber bodies, requires relatively inexperienced labor, and accurately controls the spacing of adjacent turns of the cable making up the reinforcing body for each ply.

Other objects and advantages of the invention will be apparent from the accompanying illustration and description of preferred embodiments of the invention.

In the accompanying drawings in which like numerals or references are used to designate like parts in the various views, Fig. 1 is a top plan view of a machine used in making ply material in accordance with the invention;

Fig. 2 is a sectional view taken on line 2—2 of Fig. 1;

Fig. 3 is a detailed view with parts broken away showing means for anchoring end turns of the ply material after it has been wound on a forming core;

Fig. 4 is a top plan view of the machine of Fig. 1 after the end turns of the winding on the core have been clamped in place, a central spacing member removed and one edge portion of the winding core shifted axially relative to the edge portion of the core to provide a predetermined angularity in the turns of the winding;

Fig. 5 is a top plan view of the core member in collapsed position providing for the removal of the ply material after it has been built on the machine;

Fig. 6 is a detailed view taken on the line 6—6 of Fig. 1 and illustrating a rack and pinion connection for moving one side member of the core relative to the other side member;

Fig. 7 is a similar view with parts broken away and taken on line 7—7 of Fig. 1;

Fig. 8 is a transverse sectional view taken on line 8—8 of Fig. 3;

Fig. 9 is a similar transverse sectional view taken on the line 9—9 of Fig. 3;

Fig. 10 is a sectional view taken on line 10—10 of Fig. 1 and illustrating the removable end support for the spacing member that is interposed between the opposed sections of the core member;

Fig. 11 is a top plan view of a partially completed ply unit made on the device of Fig. 1 after its removal from the machine;

Fig. 12 is an enlarged sectional view taken on the line 12—12 of Fig. 11 illustrating in somewhat exaggerated form the component parts of the ply of Fig. 11;

Fig. 13 is a similar enlarged cross sectional view of the ply illustrated in Fig. 11 after the side faces are pressed together to form an open bead receiving loop along each edge thereof;

Fig. 14 is a perspective view of a bead wire coil of steel or other high tensile material before its assembly with the ply material;

Fig. 15 is a side elevational view showing the ply material bent to the form of an open ended annulus with the bead in the loop at one edge of the annulus;

Fig. 16 is a section taken on the line indicated at 16—16 in Fig. 15;

Fig. 17 is a section taken on the line indicated at 17—17 in Fig. 15;

Fig. 18 is a view in perspective of the completed ply band after the ends of the ply material have been brought together and joined to form an endless substantially cylindrical band;

Fig. 26a is a section taken on the line 26a—26a in Fig. 25a;

Fig. 27 is a fragmentary sectional view of a cylindrical form on which the reinforcing cable is wound in constructing the ply band by an alternative method;

Fig. 28 is a view in perspective of a cylindrical ply unit built on the cylindrical form shown in Fig. 27;

Fig. 29 is a view in perspective showing the ply unit after opposed sides of the ply unit have been pressed together and adhered to provide a body with open bead loops along each edge thereof;

Fig. 30 is a view in perspective of a single turn of bead wire;

Fig. 31 is a perspective view showing the ply unit bent to open ended annular form with wire bead rings such as shown in Fig. 30 assembled therewith;

Fig. 32 is an enlarged cross sectional view taken on the line indicated at 32—32 in Fig. 31;

Figure 36:
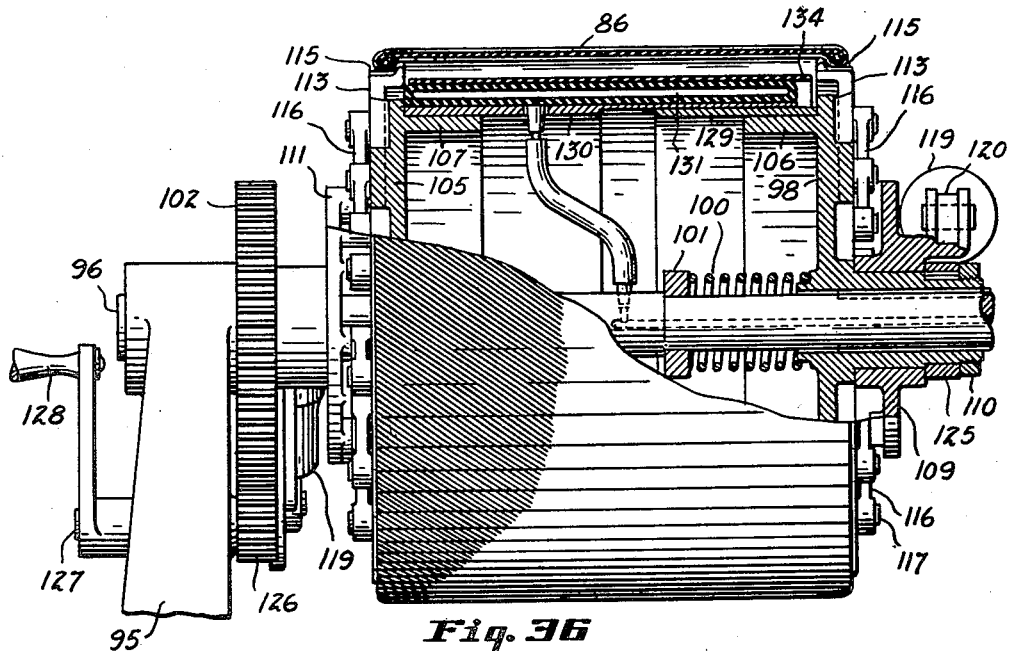
Fig. 36 is a side elevation of the machine with parts broken away to show the relative positions of parts as one bead clamping member is rotated relative to the other bead clamping member.
Figure 39:
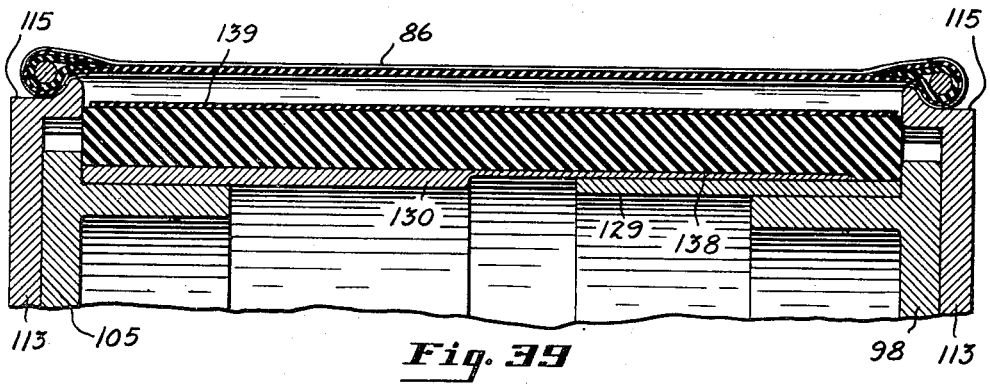
Figure 40:
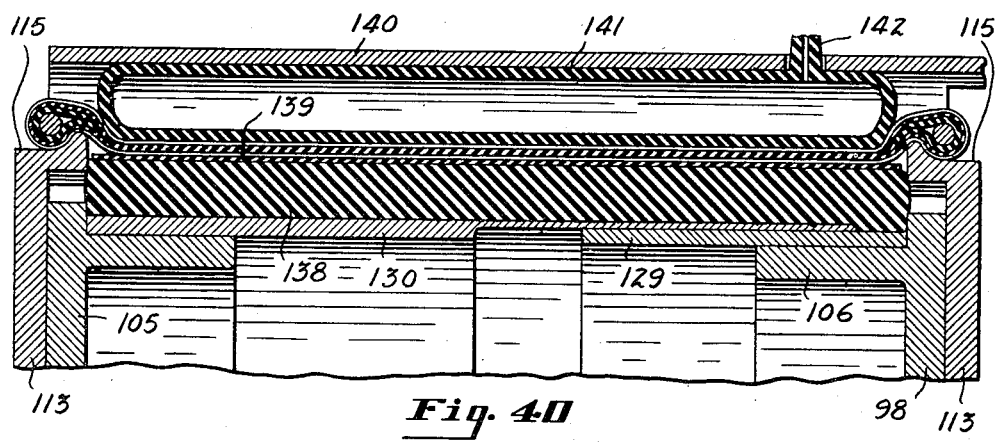

Fig. 39 is a view of an inner ply band mounted on a ply band twisting machine and which is provided with a filler pad that replaces the air bag of the machine shown in Fig. 36 for carrying an inside ply of rubber, and Fig. 40 is a similar enlarged cross sectional view of the machine of Fig. 39 after a steel confining cylinder and air bag is telescoped over the ply material and inflated to force the ply material inwardly against an adherent sheet of rubber.

The main steps involved in building tire casings by the method of the present invention are the forming of units of ply material in which a helically wound flat coil of reinforcing cable is embedded in sheet rubber, manipulation of the units to dispose the cross strands diagonally, the assembly of bead rings in loops formed in the side edges of the ply unit, forming the ply material into an endless ply band, and the building of the tire casing by assembling two of the ply bands one within the other, applying rubber covering stock to the assembled ply bands, expanding the assembled bands and rubber stock to tire form and vulcanizing.

The initial step in the forming of the ply units consists in winding the reinforcing cable in a transversely flat helical core having closely spaced convolutions adapted to form the diagonal cable reinforcement for the body of the tire casing. A winding suitable for the purpose is illustrated in Figs. 1 to 10 of the drawing and will now be described.

Flat winding machine

Referring particularly to Fig. 1, a main supporting bearing 1 carries a suitably driven hollow rotatable shaft 2 that carries a pair of opposed core members 3 and 4 through cross arms 5 and 6 each of which straddles the shaft 2 and is pivoted to it by the respective pivot pins 7 and 8.

The cross arm 5 has side members that are connected together by transverse spacing and connecting members 5a and 5b. Only one such transverse spacing and connecting member 6a is employed with the cross arm 6.

The spaced cross arms 5 and 6 are connected for parallel movement by suitable means such as a link 9, the respective ends of which are pivoted to the cross arm 5 and the cross arm 6 at points on the link 9 that are spaced apart the same distance as the pivots 7 and 8 and at points on the cross arms 5 and 6 that are at equal distances from the pivots 7 and 8.

The pivot pin 7, that passes through the supporting shaft 2 as particularly shown in Fig. 7, has a key 7a that is received in a suitable slot 2a formed in the main shaft 2. The pivot pin 7 is transversely drilled to provide a bore that is held in registry with the bore of the shaft 2 by the key 7a.

The cross arm 6 is provided with a toothed segment 10 that meshes with a pinion 11 carried on a transverse shaft 12 and driven from a pinion 13 that meshes with a longitudinally actuated rack 14 that extends through the hollow shaft 1 and the transverse bore of the pivot pin 7. By moving the rack 14 longitudinally of the shaft 1, the pinion 13 is rotated which in turn rotates the pinion 11 and the gear segment 10 to swing the parallel cross arms 5 and 6 around their respective pivots 7 and 8.

One end of the cross arm 5 has an open ended slot 5c to receive a pivot pin 15 that is carried by an arm 16 that forms an extension of the core member 3. A pivot pin 17 pivotally connects the cross arm 6 with the arm 16 of the core member 3.

The core member 4 has an arm 18 similar to the arm 16 of the core member 3 that has a pivot pin 19 engaging in a slot 5d in the end of the arm 5 opposite that engaged by the pin 15 of the arm 16 and is connected to the cross arm 6 by a pivot pin 20.

Between the core members 3 and 4 is a tapered spacer 21 that has an interfitting tongue and groove connection with the inner edge of the core members. The spacer 21 has a cylindrical extension 21a that is alined axially with the shaft 1 and rests in an open bearing in the top of a support 22 that can be removed to permit withdrawal of the spacer.

The outer ends of the core members 3 and 4 are connected by a link 23 one end of which is pivoted to the core member 4 by a pivot pin 24 and the other end of which is provided with an open slot 23a for receiving a pivot pin 25 that is carried by the core member 3. The core member 3 has a drilled hole 26 for receiving a screw driver or other implement (not shown) for pressing the slotted end of the link member 23 free from the pivot pin 25.

The members 3, 4 and 21 provide a flat core upon which an elongated helically wound coil C of wire or cable may be wound.

The axes of the pivot pins 15, 17 and 25 are in substantial alinement with the outer edge of the core member 3 and the axes of the pivot pins 19, 20 and 24 are in substantial alinement with the outer edge of the core member 4 so that windings on the core will be held taut as the core is collapsed if the portions of the windings overlying the outer edges of the core are held against movement longitudinally of the coil. As illustrated in Figs. 1 and 4 a coil C of reinforcing cable is wound in closely spaced turns on the core and is clamped by means of bars 27 while the core is collapsed.

The pivot pins 24 and 25 are attached to the side portions of the core member 4 as illustrated in Fig. 9, and a slot 28 is provided underneath each pivot pin for receiving the hooked ends 29 of the clamping bars 27.

As particularly shown in Figs. 3, 8 and 9, the clamping bars 27 are releasably connected to the core members at one end by the pins 24 and 25 and at the opposite end by U-shaped yokes 30 that are pivotally attached to the core members 3 and 4 by pivots 31.

Each of the clamping bars 27 may be slightly bowed toward the edge of the core member with which it cooperates as indicated in dotted lines in Fig. 4, so that when the bar is clamped against windings carried by the core member, the clamping pressure from end to end of the bar will be substantially uniform.

Suitable means such as a level winding mechanism that includes a guide 32 mounted for movement along one side of the core is provided for uniformly spacing the turns of the coil C of reinforcing cable as it is wound around the core member that revolves with the shaft 1. Since any of a number of well known level winding mechanisms may be employed the traversing guide 32 only is herein shown.

*Operation of flat coil winding machine*

The operator preferably first places a thin sheet of rubber 36 over the outside faces of each of the core members 3 and 4 and also places thicker and narrower strips of rubber 37 along the outer edges of the core members 3 and 4, each of the strips 37 preferably overlying the thin rubber sheets 36 on the faces of the core members.

The leading end of the reinforcing cable is passed through the guide 32 and is secured to one of the core members 3 or 4 adjacent one end in any suitable manner. The main shaft 2 of the machine then is rotated to pull the cable which is held under uniform tension through the guide 32 and wind the same in uniformly spaced turns around the core members 3 and 4. The number of turns to be employed depends upon the circumference of the tire that is being made, the core being of such width as to provide the correct length of cable between the tire beads for the particular size of tire being made.

After winding the cable on the core to provide a winding of a length corresponding to the bead circumference of the tire being made, the trailing end of the cable is fastened to one of the core members 3 or 4 to hold the winding taut. The point of attachment of the trailing end of the winding to the core should be directly opposite the point of attachment of the leading end of the winding so that these ends may be later connected.

After the winding is completed the hooked portions 29 of the clamping bars 27 are inserted under the pins 24 and 25 at the outer ends of the core members, the bars are pressed against the edge of the coil C and held in clamping position by swinging the yokes 30 over the inner ends of the clamping bars. The winding is thus clamped to the edges of the core from end to end as illustrated in Figs. 4 and 8. The clamping bars 27 serve to hold the turns of the cable in their correctly spaced relation along the outer edge of each of the core members 3 and 4 as their angularity is changed during collapse of the core.

The bearing 22 for the core spacer 21 then is removed and the spacer 21 is slid longitudinally from between the core members 3 and 4.

By imposing a longitudinal pull on the rack 14 that extends through the hollow drive shaft 2, the pinion 13 will be operated and will in turn operate the pinion 11 to actuate the segmental gear 10 (see Figs. 1, 6 and 7) to swing the cross arms 5 and 6 that are maintained in parallel relation by the link 9, and to shift the core members longitudinally one with respect to the other to the position shown in Fig. 4.

The thicker rubber strips 37 along the edges of the core serve to support the horizontal turns of the coil C clear of the thinner rubber sheets 36 on the faces of the core so that the rubber on the core does not interfere with the angular movements of the windings and the sheets 36 are not disturbed by the shifting coil.

The outer ends of the core members 3 and 4 remain supported by the pivot link 23 that moves about the pivot pins 24 and 25 after the cord is moved to the particular angularity that is desired in the tire or other device that is being constructed on the machine, such for instance as the 37½° angle illustrated in Fig. 4.

A spacer 38, narrower but of the same taper as the spacer 21 and also making tongue and groove connection with the core members 3 and 4, is inserted therebetween to provide a continuous core surface underlying the turns on the assembled core.

Forming the ply band

A suitable rubber-to-metal cement next is applied to the winding on the core and sheets of rubber are placed over the windings and pressed into the windings in order to adhere them to the sheet and hold them in the angular relation shown in Fig. 4. During this pressing operation the windings also will be adhered to the thin sheets of rubber 36 that were applied over the core members 3 and 4 and which now underlie the windings of the coil C. The coil C is now securely embedded in a body of rubber so that its angularity will be maintained upon removal from the winding machine. To remove the rubber embedded coil from the core, the clamping bars 27 are removed by releasing them from the yokes 30 and disengaging the bars from their pivot pins 24 and 25.

The filler member 38 is then removed and the link 23 that served to hold the turns of cable taut during the shifting of the core members 3 and 4 is detached from the pivot pin 25. This is done by inserting a screw driver or other suitable implement (not shown) in the slot 26 and pressing the slotted link member 23 free from its pivot pin 25. This permits the core members 3 and 4 to collapse toward each other as particularly shown in Fig. 5 to permit removal of cable reinforced rubber tube from the core.

It is desirable that projecting ends of wire 40 and 41 be provided at the end of the ply material as shown in Fig. 11, to facilitate the tying of the ends together.

The ply material at this stage is in tubular form as shown in enlarged section in Fig. 12, with the thin sheet of rubber 36 and the thicker rubber strips 37 on the inside of the tube. The inner face of the ply material preferably is treated over the areas 42 originally applied to the core edges with a material that will serve to join steel and rubber together upon application of heat such for instance as a Reanite or other preferably hard cementing material. The sheet of rubber applied to one side of the coil is preferably thicker than the sheet applied to the opposite side. As shown in Figs. 12 and 13 a thick sheet 43 is shown applied to the upper side and a thinner sheet 44 to the under side.

The elongated tubular body is collapsed by pressure applied between the side edges thereof to bring the inner faces of the rubber sheets 36 into contact except at the side edges where tubular open ended loops 45 are provided to receive bead wires as illustrated particularly in Fig. 13. This adheres the inside sheets of rubber 36 to each other and provides a composite sheet composed of rubber encased windings of the steel cable in which the turns of the cable are at the desired angle relative to the axis thereof and are held in place by the embedding rubber.

After the ply material has been flattened to the form shown in Fig. 13 it is bent longitudinally to substantially circular form with the ends thereof spaced apart a short distance as shown in Fig. 15. A short gap is left between the ends of the material in order to permit the ready insertion of the bead wire in the open ended bead loops 45. After the ply material has been bent around to the open circular form of Fig. 15 one end of a bead wire coil 46 such as shown in Fig. 14 is inserted into one end of the bead loop 45 and is fed through the loop and across the gap until the entire coil is positioned in the bead loop and the ends 47 and 48 of the coil are positioned in the gap. The ends 47 and 48 are then brought together and butt welded to provide an inextensible endless bead ring 49. The bead is then additionally turned in the pocket to make sure that the coils of the bead ring are uniformly positioned and of equal diameters.

Each of the ends 50 and 51 of the ply material next are brought into abutting relation with each other by bending the ply material to a shorter radius of curvature. The bead ring being loose in the bead loops at the edges of the band will permit the body of the band to be reduced in diameter sufficiently to abut the ends thereof together without objectionable stretching of any part of the band. The unvulcanized rubber embedding the steel cable coil is cut substantially flush with the ends of the coil so that the ends 50 and 51 of the ply material may be spliced by adhering the rubber ends together. The cable end 40 then is joined to the cable end 41 by soldering the ends while in side-by-side relation or by a simple knot so placed that the joined ends are in side-by-side relation with adjacent turns of the cable and the knot is then soldered to permanently join the ends together and provide an endless reinforing cable in the ply material. The splice should be located adjacent the bead where there is negligible flexing. After the ends 40 and 41 of the cable have been connected and the ends 50 and 51 of the ply material have been spliced an endless ply band such as shown in Fig. 18 is formed. The degree of contraction of the mid-portion of the band will depend upon the length of the gap between the ends of the ply for insertion of the bead wire and it is preferred that this gap be no longer than necessary for convenient manipulation of the bead wire.

Tire building operations

Figure 19:
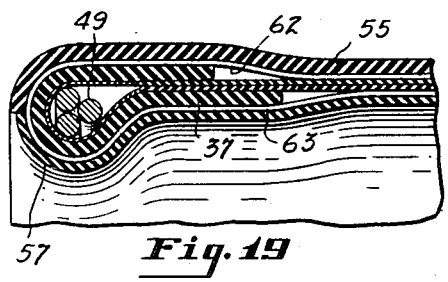
Fig. 19 is a section on an enlarged scale taken on the line indicated at 19—19 in Fig. 18 showing the construction of the ply band which forms the outer ply of a tire casing.
Figure 20:
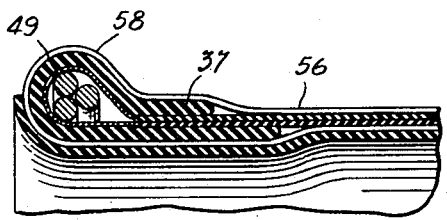
Fig. 20 is a similar view showing the construction of the ply band that forms the inner ply of a tire casing.
Figures 21, 23:
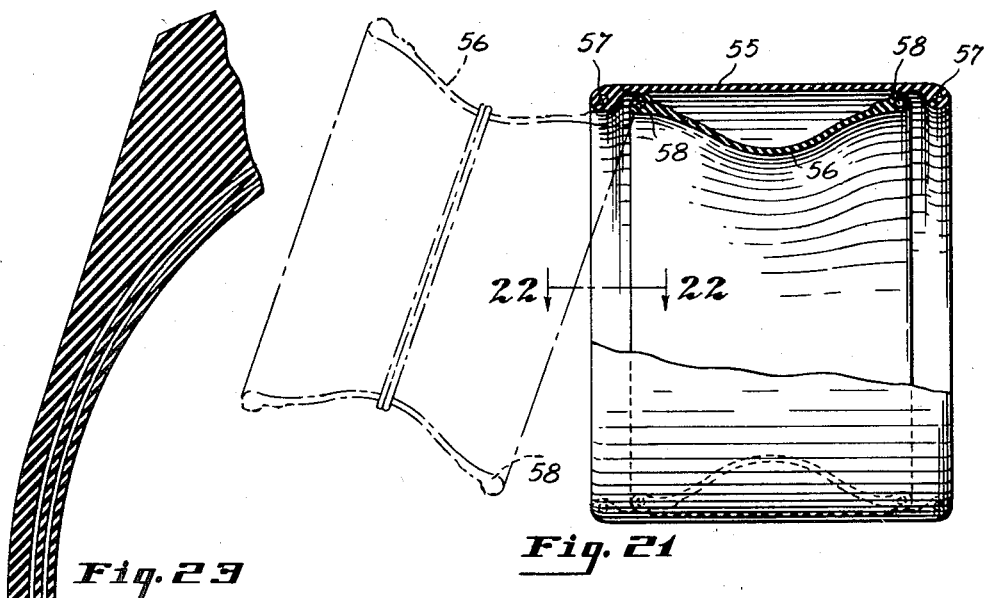
Fig. 21 is a sectional view showing the inner ply band assembled inside of the outer ply band and illustrating one method of assembling the inner ply band within the outer ply band prior to expansion of the assembly to tire casing form.
Fig. 23 is an enlarged cross sectional view of a completed tire made by the method of the present invention.

As shown in Fig. 13 the ply material before it is bent to annular form is substantially flat on one side and the bead loops 45 at its edges project on the opposite side. In building a tire two of the annular ply bands are assembled one within the other as shown in Fig. 21 with their cable turns at opposite angularity. To facilitate this assembly, the outer band 55 is formed with its beads 57 on the inside as shown in Fig. 18 and the inner band 56 is formed with its beads 58 on the outside as shown in Fig. 20. For some constructions it may be desirable to stretch the outside ply by means of an inflated rubber tube and hold it in its stretched condition to set the uncured rubber to this larger diameter before assembly with the other ply. To reduce the diameter of the inner band 56 a constricting winding is applied between the beads and so tied that it can be removed after the assembly is completed. If allowed to set for some time with the center part constricted, it will hold this shape and the constricting winding may be removed before assembly.

Figure 24:
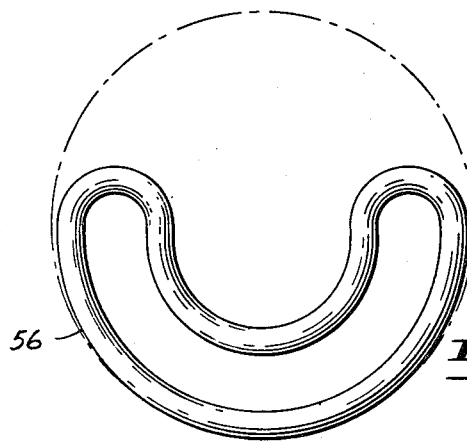
Fig. 24 is an end elevation of an inner ply band showing the same collapsed to permit its insertion into the interior of an outer ply band.
Figure 26A:
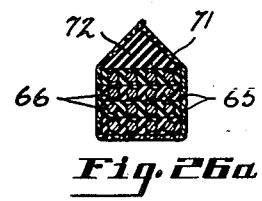

Since the beads in each edge of the bands 55 and 56 are flexible, the bead 57 of the outer band 55 may be made slightly oval by flattening it as the bead 58 of the inner ply 56 also is made oval in the other direction to enable the bead 58 to pass through the bead 57. As the bead 58 is received within the bead 57 the inner band 56 is telescoped with the outer band 55 until the inserted bead 58 reaches the position shown in full lines in Fig. 21 adjacent the bead 57 of the outer ply 55 opposite that through which the inner band has been inserted. The remaining bead 58 of the inner ply also is then flexed to oval form and inserted within the adjacent bead 57 to position the inner band as shown in Fig. 21. If desired the beads of the inner band 56 may be bent reentrantly at axially alined points far enough to collapse the band 56 to a diameter small enough to permit it to be inserted into the outer band 55 as shown in Fig. 24. After the bands 55 and 56 have been telescoped together as shown in Figs. 21 and 22 and suitable tread rubber applied, the tire is expanded to tire form by the use of an expansible tube or other suitable means, an air bag is inserted in the tire and it is vulcanized to its completed form substantially as shown in Fig. 23.

Figure 22:
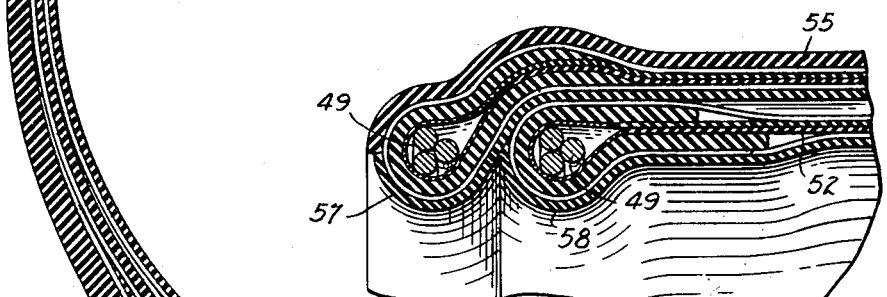
Fig. 22 is a cross section on an enlarged scale taken on line indicated at 22—22 in Fig. 21.

Either before or after the composite band shown in Fig. 22 is expanded to tire form, a bead filler 61, preferably formed from an extruded material of rather stiff consistency such for instance as a good quality fiber stock, is inserted between the beads 57 and 58 to keep these beads in a desired spaced relation.

In the completed tire the cables of each band are pressed into substantial alinement circumferentially of the casing throughout the major portion of the casing as shown in Fig. 23, providing two cable plies in the side wall and tread portions. The spacing of the cables in each ply can be regulated by regulating the spacing of the cable convolutions formed by the winding machine. It is preferred to provide the closest spacing of the cables of each ply on the side walls along a zone having a radius about two inches greater than the bead radius. Inwardly of the zone of closest spacing the cables of each ply band are separated laterally to loop about the bead rings and outwardly of the zone of closest spacing the spacing of the ply forming strands will be slightly greater due to the greater circumference of the outer portions of the casing. It is desirable that the cable strands be spaced very closely at the zone of closest spacing. For example, a clearance of about one thousandth of an inch may be provided at this zone.

The divergent cable strands in the bead portions of the tire provide a reinforcement for the inner portions of the side wall that gives a uniform increase in stiffness toward the beads that induces a very uniform flexing of the side walls under load.

It will also be apparent that the deflection characteristics of the side walls may be varied by changing the zone of closest spacing to a greater or smaller radius.

Alternative bead ring assembling method

Figure 25A:
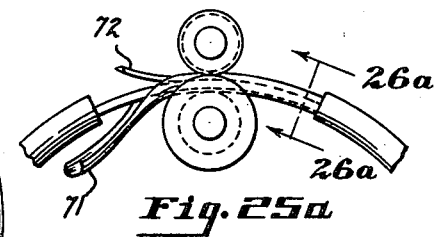
Fig. 25a shows the method of applying a fabric cover and filler to the bead shown in Fig. 25.
Figure 25:
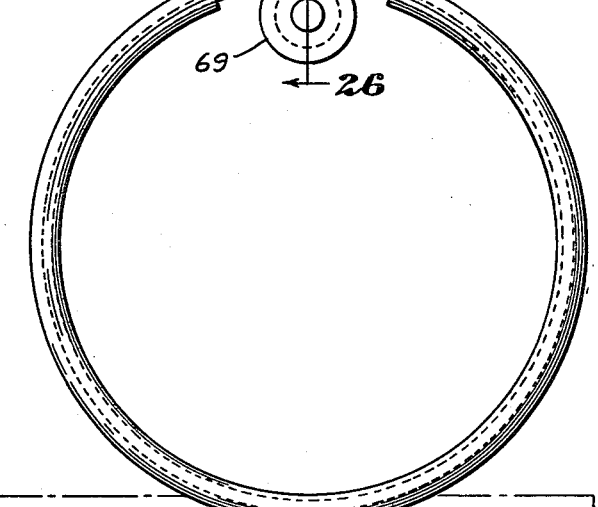
Fig. 25 shows an alternative form of bead and a method of inserting the same in a bead loop of the ply material.
Figure 26:
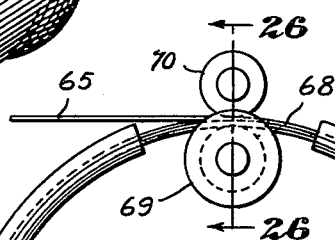
Fig. 26 is an enlarged sectional view taken on the line indicated at 26—26 in Fig. 25.

An alternative method of forming and assembling a bead ring in a ply band of the kind heretofore described is illustrated in Figs. 25 and 26. The bead as shown in Fig. 26 is formed of a plurality of convolutions of a strip 65 composed of parallel wires 66 wound spirally in a series of convolutions and a rubber body in which the wires are embedded. To form the bead the leading end of the strip 65 is passed through the bead loop 46 and joined to the body of the strip 65 at a previously determined point to provide a ring of the desired predetermined diameter for the tire being made. By employing a channeled feed roll 69 and a pressure roll 70 a number of additional convolutions formed as above described may be rotated through the bead loop to form a bead ring composed of the desired number of convolutions of wire embedded in rubber.

If desired a fabric cover 71 and a rubber filler strip 72 may be applied to the bead ring by applying strips of fabric and rubber of the proper length to the bead ring as shown in Fig. 25a while the ring is being rotated by the feed rolls 69 and 70.

Alternative method of making ply bands

An alternative method of making ply bands is illustrated in Figs. 27 to 40 inclusive. Referring particularly to Figs. 27 and 28, the ply is made up by first adhering a very thin sheet of rubber 80 to the face of a collapsible drum 81 preferably of cylindrical form. The steel cable 35 is secured at one end to the drum 81 and is wound helically upon the drum in closely spaced convolutions as shown in Fig. 27. After a sufficient number of turns of cable have been made on the drum in this manner, the cable has rubber-to-metal cement applied to it to adhere the cable to the thin sheet of rubber 80. The drum 81 then is collapsed to permit removal of the tube composed of the helically wound cable with its adherent sheet 80 of rubber. Strips 82 of rubber preferably surfaced on the inside with a suitable adhesive coating 83 that provides a relatively hard surface but which will adhere to metal upon heating are attached interiorly to diametrically opposite sides of the tube and adhered to the rubber sheet 80 throughout the length of the tube.

The cylindrical tube is collapsed to the form shown in Fig. 29, leaving bead loops 84 along the uncollapsed edge portions thereof. A section through one of the bead loops 84 is shown in Fig. 32.

Figure 33:
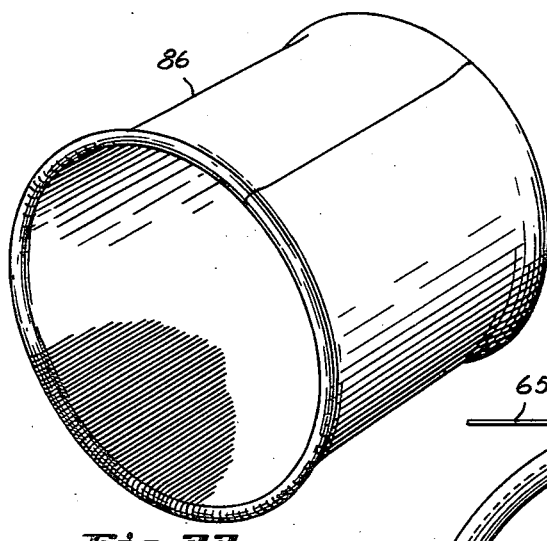
Fig. 33 is a perspective view of the band formed by joining together the ends of the ply material in which the cable convolutions are disposed substantially at right angles to the side edges.

The collapsed ply material is bent to cylindrical form as shown in Fig. 31 and suitable beads 85 are inserted in the loops 84 of the ply material in any suitable manner such as that described in connection with Figs. 14, 15, 17, 25 and 26. The ends of the ply material are then brought together and the cable ends are connected to provide a cylindrical ply band 86 such as shown in Fig. 33 in which the cable convolutions are disposed substantially parallel to the axis of the cylinder.

This completed ply band 86 with the bead wires in place and the cable strands extending in an axial direction is mounted on the machine illustrated in Figs. 34 to 37 inclusive which serves to shift the cable strands to position them at an angle to the axis of the ply band.

Figure 34:
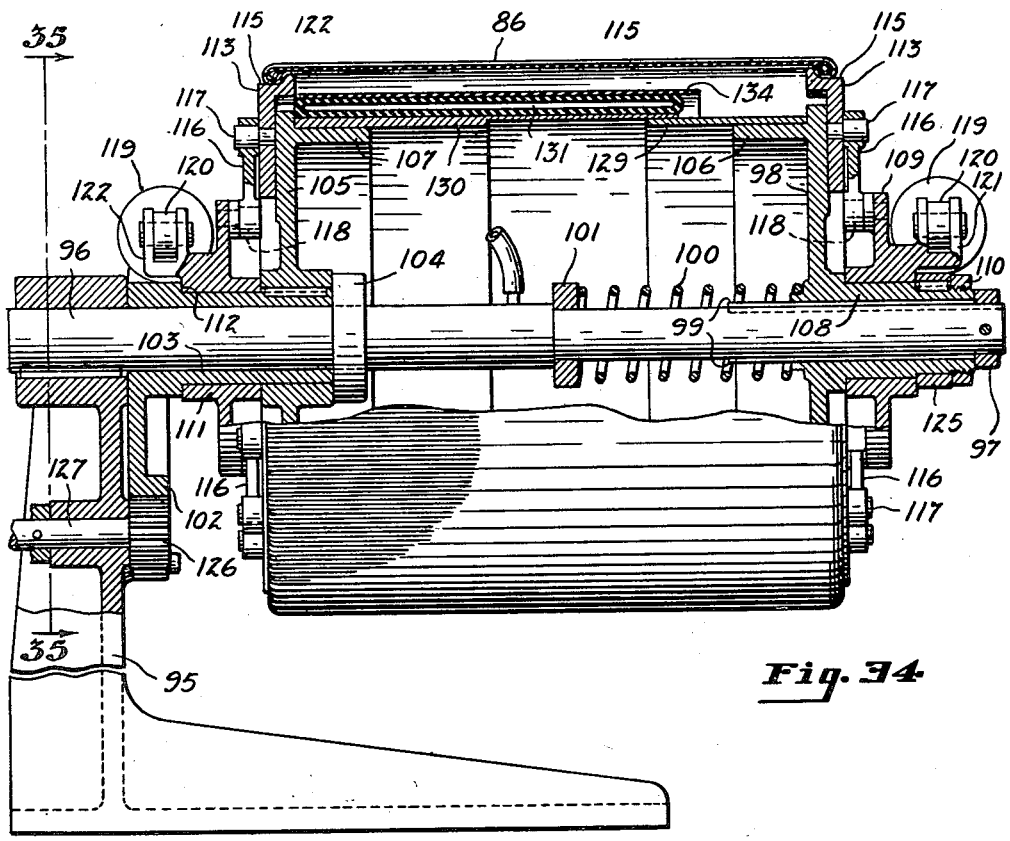
Fig. 34 is a side elevational view of a machine for changing the angularity of the reinforcing strands of a ply band formed by joining the ends of the cable reinforced annulus shown in Fig. 33.

With particular reference to Fig. 34, a standard 95 rigidly carries a main supporting shaft 96 that is non-rotatably secured to the standard 95 and provided at its outer end with a stop collar 97 and that carries a slidable disc 98 adjacent its outer end. The disc 98 is slidable on the shaft 96 and is held against rotation thereon by a suitable key 99. A helical spring 100 that seats at its inner end against a collar 101 that is held against endwise movement on the shaft 95 serves normally to press the disc 98 against the stop collar 97 with considerable pressure.

Adjacent the standard 95 a gear segment 102 is rotatably mounted on the shaft 96. The gear segment 102 has an outwardly projecting hub portion 103 and is held against endwise movement on the shaft between the standard 95 and a collar 104 fixed to the shaft 96. A disc 105 similar to the disc 98 is keyed to the outer end of the hub 103. Outwardly of their hub portions the discs 98 and 105 may be identical in construction, having cylindrical flanges 106 and 107 of the same diameter projecting inwardly from their opposed faces inwardly of their peripheries.

The disc 98 has an outwardly projecting hub portion 108 upon which is rotatably mounted an actuating collar 109 that is held in place by a nut 110 on the outer end of the hub portion 108. An actuating collar 111 similar to the collar 109 is rotatably mounted on the hub 103 of the gear segment between the disc 105 and a shoulder 112 on the hub 108. The actuating collars 109 and 111 serve to expand and contract bead engaging rim segments 113 carried by the discs 98 and 105. The actuating connections as well as the rim segments carried by the two discs are identical and are indicated by the same reference numerals in the drawing. Each of the segments 113 is guided in a radial channel 114 in the outer face of its supporting disc and each segment has an arcuate bead seating portion 115 that has a short peripheral flange at its inner edge to engage the inner side of the bead of the ply flange. The rim segments 113 are each connected to the collars 109 and 111 by means of an actuating link 116 connected at its outer end to the segment by a pivot 117 and at its inner end to the actuating collar by a pivot 118.

Figure 35:
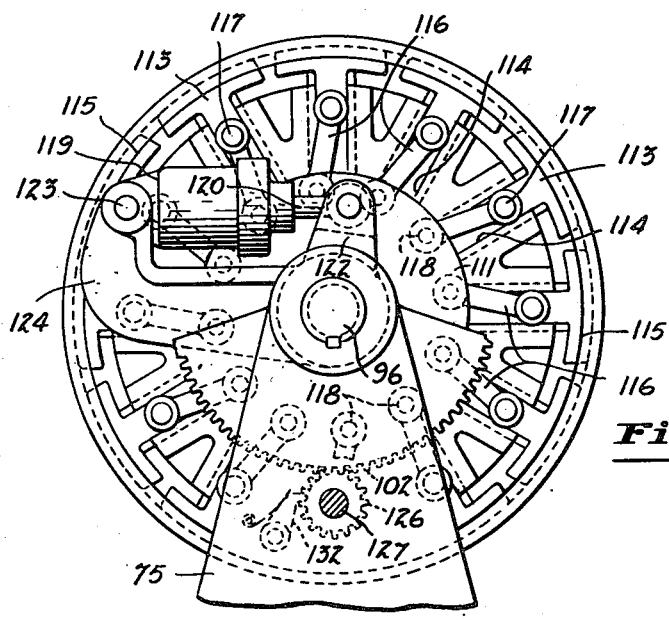
Fig. 35 is an end elevation of the machine shown in Fig. 34 viewed as indicated at 35—35 in Fig. 34.

The segments 113 are expanded into engagement with the beads of the ply band 86 by means of two fluid pressure cylinders 119, each having a piston rod 120 connected, one to an arm 121 on the actuating collar 109 and the other to an arm 122 on the actuating collar 111. As shown in Fig. 35 the cylinder 119 that actuates the collar 111 is supported at its outer end on a pivot pin 123 that is mounted in an arm 124 that is rigidly attached to the gear segment 102. The cylinder 119 that actuates the collar 111 is supported on an arm 125 similar to the arm 124 that is rigidly attached to the hub 108 of the disc 98.

The gear segment 102 meshes with a pinion 126 on a shaft 127 that is actuated by suitable means such as a hand crank 128. By means of the cylinders 119 the actuating collar 109 may be turned with respect to the shaft 96 to expand the bead engaging rim segments on the disk 98 and the actuating collar 111 may be turned with respect to the gear segment 102 to expand the rim segments carried by the disc 105. The disc 98, being keyed to the shaft 96 is held against turning movements while the disc 105 turns with the gear segment 102.

The cylindrical flanges 106 and 107 of the discs 98 and 105 provide supports for telescopically connected cylinders 129 and 130. The cylinder 129 carried by the flange 106 fits within the cylinder 130 carried by the flange 107, the cylinder 130 being longer than the cylinder 129 and providing a support for an inflatable air bag 131 which when collapsed is positioned within the ply band receiving rim portions of the discs.

In the operation of the machine shown in Figs. 34 to 36 inclusive, the cylindrical ply band 86 with its cable convolutions extending in an axial direction is positioned with its beads overlying the expansible rim members of the discs and air is applied to the pressure cylinders 119 to force the rim segments radially outwardly into gripping engagement with the beads of the band 86.

Figure 37:
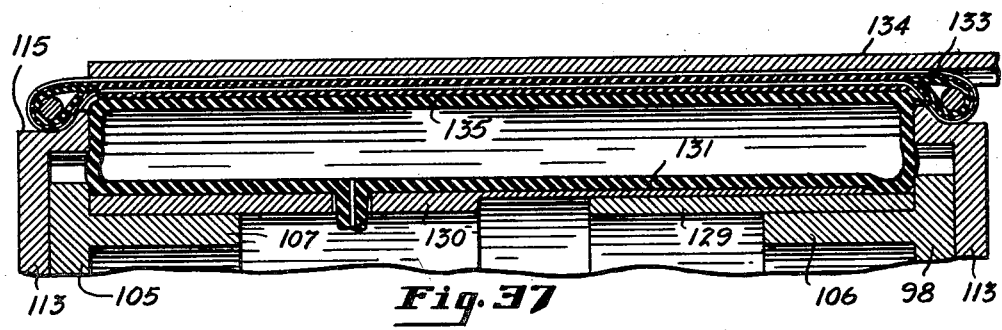
Fig. 37 is an enlarged cross sectional view of the top portion of the machine of Fig. 36 showing a metal cylinder telescoped over the ply band and the air bag inflated to adhere the reinforcing cable to superimposed layers of rubber.

After the beads of the ply band 86 are thus clamped in place on the machine, the gear segment 102 is turned and with it the disc 105 to turn the bead of the ply band that is gripped by the expansible rim members carried by the disc 105 relative to the bead that is gripped by the rim members on the non-rotatable disc 98. The disc 105 is turned through an angle such that the cross strands in the ply band 86 are given any desired degree of angularity relative to the axis of the band. As the disc 105 is thus rotated, the beads of the ply band 86 will be drawn axially one toward the other by the change in angularity of the wire cross strands. This shortening of the ply band drags the bead carrying disc 98 along the key 99 toward the bead carrying disc 105 in opposition to the pressure of the helical spring 100. The pressure of the spring 100 maintains the cable strands of the ply in taut condition as the outer bead carrying disc 98 is thus brought toward the inner bead carrying disc 105 that is being rotated. When the desired degree of angularity has been obtained in the elements of the ply band 86, the gear segment 102 is locked by suitable means such as a pawl 132 to hold the ply band in adjusted position. The cable reinforcing the ply band 86 then has a suitable rubber-to-metal cement applied to it, a sheet of rubber 133 is placed over the ply 86 and a metal cylinder 134 is telescoped over the ply 86 as shown in Fig. 37. By inflating the air bag the cable strands of the ply band 86 are compacted together and pressed into the rubber sheet 133 against the interior of the metal cylinder 134 and adhered thereto by the previously applied rubber-to-metal adhesive. This cements the cable cross strands to the outside sheet of rubber 133 which will then hold the cable turns in their proper angularity relative to the axis of the machine.

A sheet of rubber 135 may be applied to the interior of the ply band by applying the same to the periphery of the collapsed air bag 131 before the ply band is placed on the machine, the sheet 134 being pressed against the interior of the ply band upon inflation of the air bag.

Figure 38:
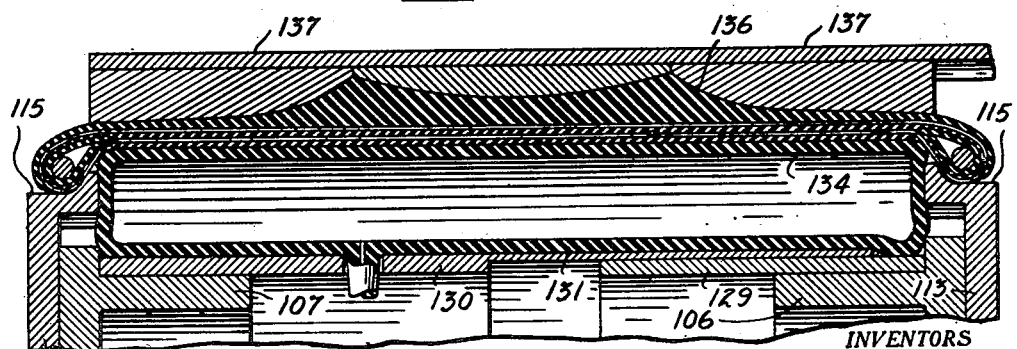
Fig. 38 is a corresponding enlarged cross sectional view showing the application of the tread and side wall material to a ply band.

The completed ply band is removed from the machine after releasing pressure from the cylinders 119 to permit the actuating collars 109 and 111 to turn in a direction to retract the rim segments 113 and release the band. An inner band so formed may be assembled within an outer ply band and built into a tire in the manner heretofore described. If desired the outer ply band may be adhered directly to an endless tread 136 applied to the periphery of the band and pressed against the inside of a suitable cylinder 137 as shown in Fig. 38, to adhere the cable strands to the superimposed tread.

The ply band forming machine may be employed to form either the outer ply bands with inwardly projecting beads, or inner ply bands with outwardly projecting beads. As shown in Figs. 39 and 40 a cylindrical pad 138 of rubber or the like may be mounted upon the cylinder 130 and a sheet of rubber 139 may be applied to the periphery of the pad to lie within the ply band 86 supported on the expansible rims of the discs 98 and 105. A metal cylinder 140 with an inflatable air bag 141 mounted upon the interior thereof is telescoped over the band 86, and the air bag is expanded to press the band inwardly against the sheet 139 to adhere the same to the interior of the band. The air bag 141 normally lies flat against the interior of the cylinder 140 and receives air under pressure through a stem 142 extending through an opening in the cylinder 140.

It is to be understood that variations and modifications of the specific devices herein shown and described for purposes of illustration, may be made without departing from the spirit of the invention.

What we claim is:

1. The herein described method of making a ply band for use in building pneumatic tire casings which comprises winding a cabled high tensile steel wire helically to form an elongated coil, shifting one side of the coil longitudinally with respect to the other to dispose the convolutions diagonally, applying an unvulcanized rubber sheet to said coil, compressing the coil to form a strip having a central flat portion with diagonal strands side by side and embedded in rubber and open loops along opposite edges, bending the strip to substantially circular form, inserting bead wires through said loops and joining the end of the wires to form bead rings and joining the end edges of the rubber sheet to form an endless reinforced ply band.

2. The herein described method of making a ply band for use in building pneumatic tire casings which comprises forming a transversely flat helically wound coil of cabled high tensile steel wire, applying strips of unvulcanized rubber to the interior of the coil along opposite side edges, displacing one side edge of the coil longitudinally with respect to the other to dispose the convolutions diagonally, applying unvulcanized sheet rubber to the flat portions of the coil and pressing the central portion of the coil flat to embed the wire strands in rubber and leaving open loops along the sides thereof, bending the rubber covered coil longitudinally to circular form, inserting bead wires through the loops and fastening the ends thereof together to form rings, and attaching the end edges to the sheet rubber together to form an endless ply band.

3. The method of making an endless ply unit which consists in winding a cabled high tensile steel wire in helical form over an unvulcanized rubber sheet to adhere the adjacent convolutions to the sheet, adhering opposed faces of the sheet except along diametrically opposite zones of the halical winding to provide a flat strip with longitudinal bead loops along opposite edges, bending the adhered sheet longitudinally to substantially circular form, forming endless wire beads in said pockets, and adhering the adjoining ends of said rubber sheet.

4. The herein described method of making a ply band for use in building pneumatic tire casings which comprises winding a cabled high tensile steel wire helically to form an elongated coil, adhering unvulcanized sheet rubber to portions of the coil and compressing the coil to form a ply band strip having a central flat portion with wire strands disposed side by side and embedded in rubber and edge portions in the form of open loops, bending the ply band strip to circular form, forming bead rings in said open loops, and joining the ends of the ply band strip.

5. The herein described method of making a ply band for use in building pneumatic tire casings which comprises forming an elongated ply band strip by winding a cabled high tensile steel wire helically to form an elongated coil, adhering unvulcanized sheet rubber to the coil, adhering rubber strips to opposite interior portions of the coil and flattening the coil intermediate said rubber strips to form a flat central portion in which the wire strands lie side by side and embedded in rubber and edge portions in the form of open loops reinforced by said rubber strips, and forming the ply band by bending the ply band strip to circular form, forming bead rings in said open loops, and joining the ends of the ply band strips.

6. The herein described method of making a ply band for use in building pneumatic tire casings which comprises forming a ply band strip comprised of a coil of cabled high tensile steel wire having closely spaced convolutions and strips of rubber adhering to said coil to maintain the spacing of the convolutions of the wire, shaping the said strip to provide a flat central portion and edge portions in the form of open loops, and forming an endless band by bending said strip to bring one end thereof adjacent the other, forming an endless bead ring in the looped edges of the strip and joining the ends of said rubber strips and said wire.

HERMAN T. KRAFT.
WILLIAM C. McCOY.

REFERENCES CITED

The following references are of record in the file of this patent:

UNITED STATES PATENTS

| Number | Name | Date |
|---|---|---|
| 1,009,366 | Wirt | Nov. 21, 1911 |
| 1,318,643 | Butler | Oct. 14, 1919 |
| 1,420,611 | Dickinson | June 20, 1922 |
| 1,453,217 | Weigel | Apr. 24, 1923 |
| 1,496,164 | Morris | June 3, 1924 |
| 1,562,678 | Beyea | Nov. 24, 1925 |
| 2,139,840 | McKone | Dec. 13, 1938 |
| 2,143,694 | Hauvette | Jan. 10, 1939 |
| 2,241,125 | Girard | May 6, 1941 |
| 2,257,604 | Harrah | Sept. 30, 1941 |
| 2,366,087 | Chernack | Dec. 26, 1944 |
| 2,401,045 | Brickman | May 28, 1946 |